(12) United States Patent
Toyoshima

(10) Patent No.: US 7,890,947 B2
(45) Date of Patent: Feb. 15, 2011

(54) SYSTEM, METHOD AND APPARATUS FOR EMBEDDED FIRMWARE CODE UPDATE

(75) Inventor: Akihiko Toyoshima, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2397 days.

(21) Appl. No.: 09/972,781

(22) Filed: Oct. 5, 2001

(65) Prior Publication Data

US 2002/0087759 A1 Jul. 4, 2002

Related U.S. Application Data

(60) Provisional application No. 60/240,001, filed on Oct. 13, 2000.

(51) Int. Cl.
- G06F 9/44 (2006.01)
- G06F 9/445 (2006.01)
- G06F 15/177 (2006.01)

(52) U.S. Cl. ............. 717/173; 717/177; 717/178; 709/221

(58) Field of Classification Search ............ 717/171, 717/172; 455/556.1
See application file for complete search history.

(56) References Cited

U.S. PATENT DOCUMENTS

| | | | | |
|---|---|---|---|---|
| 4,593,155 A | * | 6/1986 | Hawkins | 455/411 |
| 4,908,848 A | * | 3/1990 | Hanawa | 455/565 |
| 5,036,532 A | | 7/1991 | Metroka et al. | 455/566 |
| 5,109,403 A | * | 4/1992 | Sutphin | 455/419 |
| 5,243,653 A | | 9/1993 | Malek et al. | 380/272 |
| 5,294,792 A | | 3/1994 | Lewis et al. | 250/221 |
| 5,297,192 A | * | 3/1994 | Gerszberg | 455/419 |
| 5,398,285 A | | 3/1995 | Borgelt et al. | 380/30 |
| 5,699,275 A | * | 12/1997 | Beasley et al. | 709/221 |
| 5,781,723 A | | 7/1998 | Yee et al. | 713/200 |
| 5,790,800 A | | 8/1998 | Gauvin et al. | 709/227 |
| 5,884,195 A | | 3/1999 | Gomez et al. | 455/572 |
| 5,893,037 A | * | 4/1999 | Reele et al. | 455/556.1 |

(Continued)

OTHER PUBLICATIONS

Samsung, Press Releases, Aug. 16 2001, (http://www.samsung.com/sg/presscenter/pressrelease/semiconductorsnews_20010816_0000016218.asp), p. 1.*

(Continued)

Primary Examiner—Thuy Dao
(74) Attorney, Agent, or Firm—John L. Rogitz

(57) ABSTRACT

A wireless module is provided for wirelessly updating code to any appropriate peripheral device and may allow for wireless communication with the desired peripheral device to update an operating software code. The wireless module has the similar size, shape, and form factor as the current Memory Stick™. In one embodiment, the method of updating code to the wireless module and/or the desired peripheral devices includes providing a fail-safe code to the peripheral device, updating the peripheral device with a new code utilizing the wireless module, and executing a primary code for operation of the peripheral device. Further, the wireless module may be provided to any number of peripheral devices compatible with the Memory Stick™ removable data storage media. The wireless module is removably connected to the desired peripheral device and provides the peripheral device with a fail-safe system, method and apparatus for updating the embedded operational software code without recalling and servicing the peripheral device.

8 Claims, 4 Drawing Sheets

U.S. PATENT DOCUMENTS

| | | | | |
|---|---|---|---|---|
| 5,936,887 | A * | 8/1999 | Choi et al. | 365/185.17 |
| 5,964,830 | A | 10/1999 | Durrett | 709/200 |
| 6,049,717 | A * | 4/2000 | Dufour et al. | 455/446 |
| 6,078,806 | A * | 6/2000 | Heinonen et al. | 455/406 |
| 6,078,908 | A | 6/2000 | Schmitz | 705/50 |
| 6,091,956 | A * | 7/2000 | Hollenberg | 455/456.5 |
| 6,108,727 | A * | 8/2000 | Boals et al. | 710/68 |
| 6,128,389 | A | 10/2000 | Chan et al. | 380/247 |
| 6,137,473 | A * | 10/2000 | Cortopassi et al. | 345/156 |
| 6,198,479 | B1 | 3/2001 | Humpleman et al. | 345/329 |
| 6,279,153 | B1 * | 8/2001 | Bi et al. | 717/171 |
| 6,330,975 | B1 | 12/2001 | Bunte et al. | 235/472.01 |
| 6,366,487 | B1 * | 4/2002 | Yeom | 365/52 |
| 6,421,325 | B1 | 7/2002 | Kikinis | 370/280 |
| 6,424,827 | B1 | 7/2002 | McGregor et al. | 455/411 |
| 6,438,749 | B1 * | 8/2002 | Chamberlain | 717/174 |
| 6,445,914 | B1 | 9/2002 | Findikli et al. | 455/411 |
| 6,473,609 | B1 * | 10/2002 | Schwartz et al. | 455/406 |
| 6,532,370 | B1 | 3/2003 | Underbrink et al. | 455/522.1 |
| 6,628,934 | B2 | 9/2003 | Rosenberg et al. | 455/411 |
| 6,651,149 | B1 * | 11/2003 | Iwasaki | 711/163 |
| 6,651,249 | B2 * | 11/2003 | Waldin et al. | 717/170 |
| 6,662,023 | B1 | 12/2003 | Hell | 455/558 |
| 6,684,084 | B1 | 1/2004 | Phillips | 455/558 |
| 6,694,430 | B1 | 2/2004 | Zegelin et al. | 713/160 |
| 6,696,919 | B1 | 2/2004 | Leickel et al. | 340/5.74 |
| 6,728,531 | B1 | 4/2004 | Lee et al. | 455/419 |
| 6,788,332 | B1 | 9/2004 | Cook | 455/556.1 |
| 6,804,730 | B1 | 10/2004 | Kawashima | 710/36 |
| 6,871,063 | B1 | 3/2005 | Schiffer | 455/410 |
| 6,874,143 | B1 * | 3/2005 | Murray et al. | 717/173 |
| 7,069,452 | B1 * | 6/2006 | Hind et al. | 713/1 |
| 2001/0016495 | A1 * | 8/2001 | Chandnani et al. | 455/445 |
| 2002/0012329 | A1 * | 1/2002 | Atkinson et al. | 370/330 |
| 2002/0056142 | A1 | 5/2002 | Redmond | 725/151 |
| 2002/0080741 | A1 | 6/2002 | Toyoshima | |
| 2002/0081993 | A1 | 6/2002 | Toyoshima | |
| 2002/0082048 | A1 | 6/2002 | Toyoshima | |
| 2002/0085530 | A1 | 7/2002 | Toyoshima | |
| 2002/0087759 | A1 | 7/2002 | Toyoshima | |
| 2002/0174190 | A1 | 11/2002 | Toyoshima | |
| 2004/0031030 | A1 * | 2/2004 | Kidder et al. | 717/172 |

OTHER PUBLICATIONS

"Low-voltage memories for power-aware systems", K. Itoh, Aug. 2002, pp. 1-6, <http://delivery.acm.org/10.1145/570000/566409/p1-itoh.pdf>.*

"A unified wireless LAN architecture for real-time and non-real-time communication services", Choi et al., Feb. 2000, pp. 44-59, <http://delivery.acm.org/10.1145/340000/332996/00836477.pdf>.*

"Patchable instruction ROM architecture", Sherwood et al., Nov. 2001, pp. 24-33, <http://delivery.acm.org/10.1145/510000/502222/p24-sherwood.pdf>.*

U.S. Appl. No. 09/976,455, filed Oct. 11, 2001, Toyoshima.

* cited by examiner

| Version | Stored Address | Release Date | Primary Mark |
|---|---|---|---|
| 1.00 | 0x00000-0xffff | 2000.10.1 | - |
| 1.05 | 0x10000-0x2ffff | 2001.1.3 | - |
| 1.10 | 0x30000-0x4ffff | 2001.9.1 | Marked |
| . . . . | | | |

SYSTEM, METHOD AND APPARATUS FOR EMBEDDED FIRMWARE CODE UPDATE

This application is related to and incorporates herein by reference the present assignee's U.S. patent applications Ser. Nos. 09/977,080, filed Oct. 21, 2001, now U.S. Pat. No. 6,907,456; Ser. No. 09/972,183, filed Oct. 5, 2001, now U.S. Pat. No. 7,460,853; Ser. No. 09/974,724, filed Oct. 9, 2001; Ser. No. 09/972,760, filed Oct. 5, 2001; Ser. No. 09/976,455, filed Oct. 11, 2001, now U.S. Pat No. 7,230,939; Ser. No. 09/972,761, filed Oct. 5, 2001, now U.S. Pat. No. 7,020,118; Ser No. 09/928,582, filed Aug. 13, 2001; and provisional patent application Ser. No. 60/240,001, filed Oct. 13, 2000. Priority is claimed from all earlier-filed applications listed above.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. the Patent and Trademark Office patent file or records, but otherwise reserves all copyright rights whatsoever.

FIELD OF THE INVENTION

This invention relates generally to the field of systems and methods for updating an embedded operating software code. More particularly, this invention relates to a wireless module system and method for updating an embedded code.

BACKGROUND OF THE INVENTION

The need for portability of data has increased over the years, and has spurred the development of removable memory devices. For example, Memory Stick™ is a removable data storage device made by Sony Corporation and is a recordable integrated circuit (IC) digital storage device having a storage capacity greater than a standard 3.5 inch floppy disk. Most importantly, Memory Stick™ is smaller than a stick of gum, very lightweight, and therefore ultra-portable. Recently, software code has increased in size and complexity for a peripheral device. For example, a cellular phone utilizes an embedded software code which brings many fancy and convenient functions to a user. However, due to the size and complexity of the software code, once a significant software code bug or flaw is detected the user may be unable to operate their peripheral device. Given the risks to manufactures and service operators of peripheral devices, it would be desirable to provide fail-safe system, method and apparatus for updating the code without recalling and servicing peripheral devices.

SUMMARY OF THE INVENTION

In view of the foregoing, a wireless module is provided for wirelessly updating code to a peripheral device.

In particular, a wireless module, in one embodiment, has the similar size, shape, and form factor as the current Memory Stick™. Also, the wireless module allows for wireless communication with digital storage functionality. In one embodiment, a method of updating code includes providing a fail-safe code to a peripheral device, updating the peripheral device with a new code utilizing the wireless module, and executing a primary code for operation of the peripheral device.

In a further embodiment, the wireless module may be provided to any number of peripheral devices compatible with the Memory Stick™ removable data storage media.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which:

FIG. 3 is a table illustrating one embodiment of incidental information provided when updating code.

DETAILED DESCRIPTION OF THE INVENTION

While the present invention has been particularly shown and described with reference to an embodiment(s), it will be understood that various changes and modifications may be made without departing from the spirit and scope of this invention. It is intended that the appended claims be interpreted to cover the embodiments described herein and all equivalents thereto.

Figure 1:
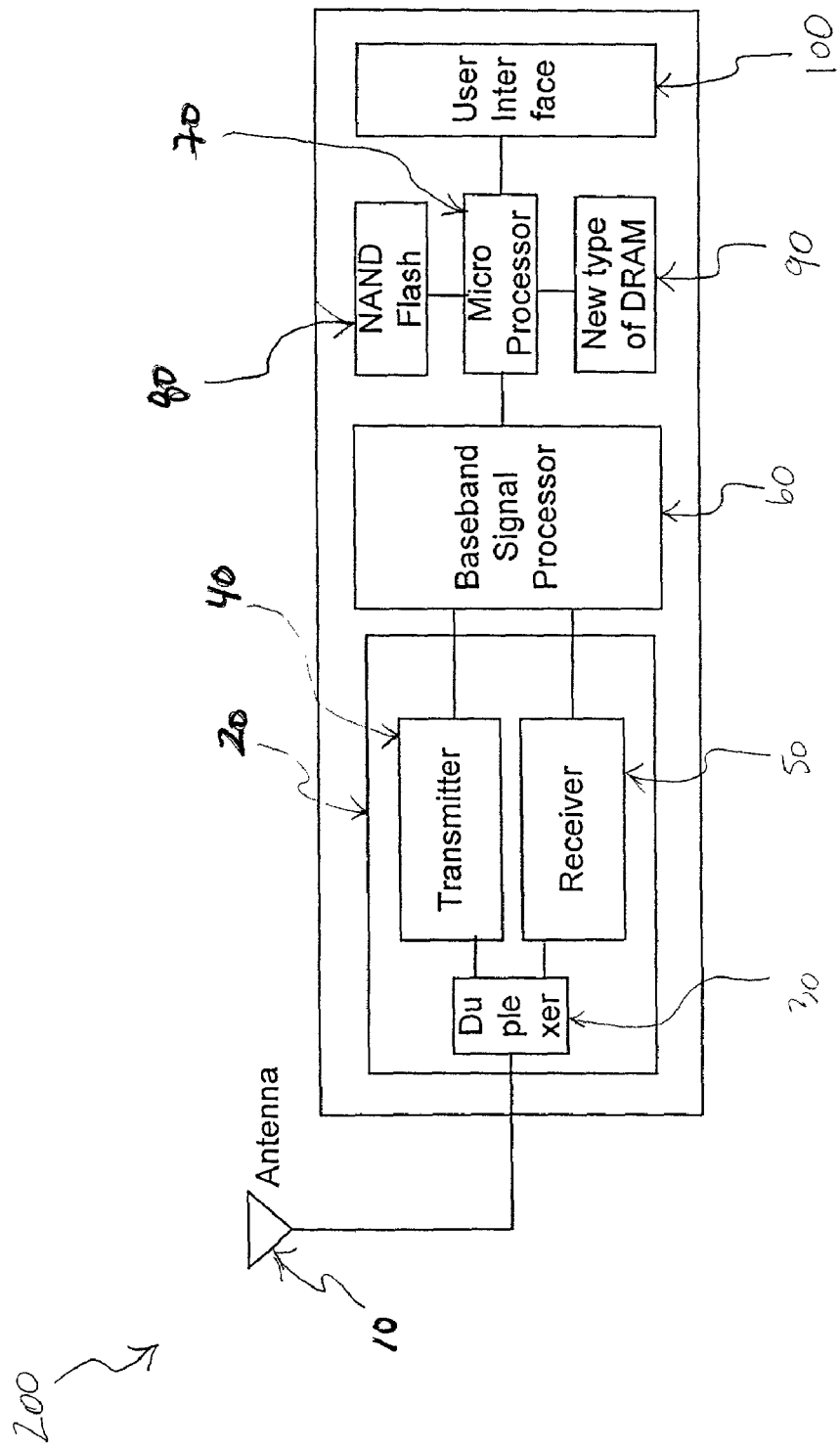
FIG. 1 is a block diagram of one embodiment of a wireless module.

Turning now to FIG. 1, one embodiment of a wireless module 200 is shown. Wireless module 200 includes an antenna 10 connected to a transceiver circuit 20. Transceiver circuit 20 includes a duplexer 30, a transmitter 40, and a receiver 50. Transmitter 40 and receiver 50 of transceiver circuit 20 are connected to a baseband signal processor circuit 60. Baseband signal processor circuit 60 is connected to a microprocessor 70. A Not AND FLexible Architecture for Shared memory (NAND FLASH) processor 80, a Dynamic Random Access Memory (DRAM) circuit 90, and a user interface 100 are also connected to microprocessor 70. In another embodiment, user interface 100 may include an input/output (I/O) interface (not shown) and a peripheral device (not shown) may be connected to wireless module 200 through the I/O.

In operation, wireless module 200 receives a signal(s) containing data packets through antenna 10 and forwards the received signals and data packets to duplexer 30, through receiver 50, and to baseband signal processor circuit 60. The data packets/received signals will then be forwarded to microprocessor 70 and through user interface 100 and/or to NAND FLASH 80 and DRAM 90. For example, a wireless telephone, or any other type of device or unit which can handle the data packets/received signals, may contain wireless module 200 and user interface 100 may be a speaker, microphone, key, and display for the wireless telephone. Wireless module 200 receives and transmits data packets/received signals utilizing at least one wireless format selected from the group consisting of IS-95B, CDMA 2000 1X, CDMA 1X EV, CDMA ONE, Wideband CDMA, GSM, GPRS and EDGE. In another embodiment, the peripheral device may engage in simultaneous transmission and reception of data packets through the I/O, microprocessor 70, NAND FLASH 80, DRAM 90, baseband signal processor circuit 60, and transceiver circuit 20.

Figure 2:
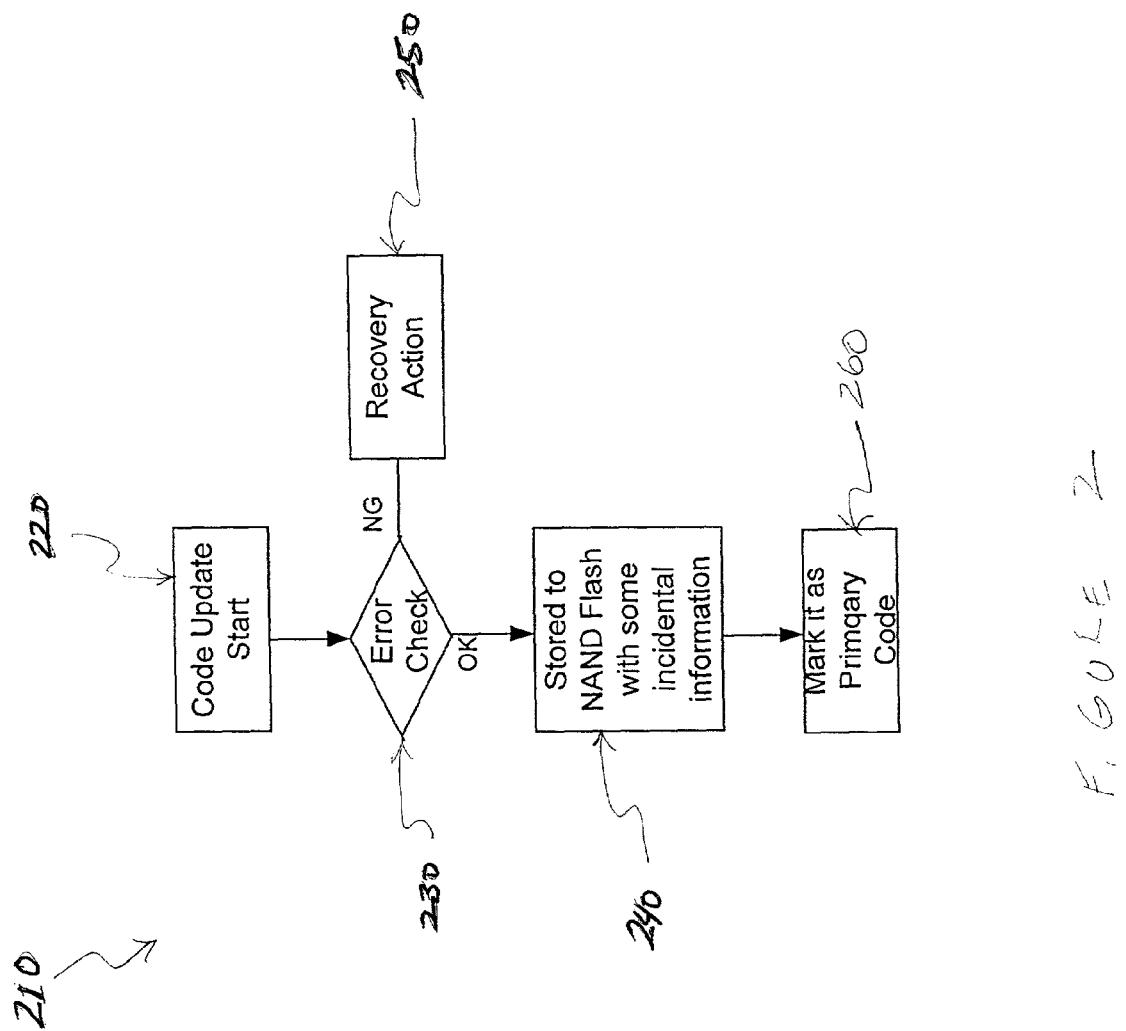
FIG. 2 is a flow diagram illustrating the steps of one embodiment of a method for updating code to a peripheral device utilizing the wireless module.

FIG. 2 shows a flow diagram 210 illustrating the steps of one embodiment of a method for updating code utilizing wireless module 200 (shown in FIG. 1) to the peripheral device. Initially, the method for updating code includes providing a fail-safe code (not shown) to wireless module 200. In one embodiment, the fail-safe code is stored in the peripheral device. In another embodiment, the fail-safe code is stored inside NAND FLASH 80 in wireless module 200. A step 220 of the method for updating code includes starting a code update process and includes utilizing wireless module 200 for wirelessly updating a new code (not shown). In one embodiment, the new code is wirelessly transmitted utilizing at least one wireless format selected from the group consisting of IS-95B, CDMA 2000 1X, CDMA 1X EV, CDMA ONE, Wideband CDMA, GSM, GPRS and EDGE. In one embodiment, once the new code is wirelessly transmitted it is stored in the peripheral device. In another embodiment, once the new code is wirelessly transmitted the new code is then stored at least once to DRAM 90 in wireless module 200. Step 220 then progresses to a step 230 which illustrates that an error check (not shown) on the new code takes place. If step 230 determines that no errors are found in the new code, then the method for updating code further includes verifying that the new code is an error free new code (not shown) and progresses to step 240 where storing the error free new code takes place. In one embodiment, the error free new code is stored in the peripheral device. In another embodiment, the error free new code is stored to NAND FLASH 80 in wireless module 200. In a further embodiment, incidental information (shown in FIG. 3) is also stored to NAND FLASH 80. If step 230 determines that errors were found in the new code, then the method for updating code fails in step 250 and a recovery action (not shown) is begun until the method for updating code is successfully executed. In one embodiment, the recovery action includes operating the peripheral device with the fail-safe code. In another embodiment, the recovery action includes operating wireless module 200 with the fail-safe code. In a further embodiment, the recovery action includes re-initiating step 220 and starting the code update process.

Flow diagram 210 illustrates the conclusion to one embodiment of the method for updating code by marking a primary code (not shown) in a step 260. In one embodiment, the fail-safe code is marked as the primary code and stored in NAND FLASH 80. In another embodiment, the error free new code is marked as the primary code and stored in NAND FLASH 80 and the fail-safe code is un-marked as the primary code and also stored in NAND FLASH 80. In a further embodiment, allowing selection of the primary code is provided such that even after the code update process, if a user detects some fatal operation errors when using the peripheral device or wireless module 200, the user can manually switch the primary code to the fail-safe code or any other code version stored in NAND FLASH 80 until an improved code is available. The allowing selection of the primary code also allows a manufacturer or an provider to automatically switch the primary code to the fail-safe code or any other code version as well, through wireless communication with wireless module 200 and/or the peripheral device without the awareness or any operation of the user.

FIG. 3 depicts a table 300 and one embodiment of incidental information 310 provided when updating code utilizing wireless module 200 (shown in FIG. 1). As shown, in one embodiment, incidental information 310 includes a version number 320, a stored address 330, a release date for updated code (not shown) 340, as well as some notation as to primary code mark 350. A system (not shown) for updating code includes wireless module 200 which is configured to store the fail-safe code and the peripheral device which is in electronic data communication with wireless module 200. Wireless module 200 is further configured to receive and transmit the updated code. The system for updating code further includes a base station (not shown) in electronic data communication with wireless module 200. The base station is configured to transmit the updated code. In one embodiment, the system for updating code which includes wireless module 200 also includes NAND FLASH 80 configured to store the fail-safe code. In one embodiment, wireless module 200 further includes DRAM 90 in data communication with NAND FLASH 80, where DRAM 90 is configured to store at least once the updated code.

In one embodiment, NAND FLASH 80 is further configured to receive and store the primary code, and DRAM 90 is further configured to receive and load the primary code. In one embodiment, the primary code is the fail-safe code, and in another embodiment the primary code is the updated code. In a further embodiment, wireless module 200 further includes NAND FLASH 80 which is configured to allow for selection of the primary code. As shown in FIG. 3, a version 1.10 (360) is marked as the primary code. Incidental information 310 includes stored address 330 and release date 340 of version 1.10 (360). Incidental information 310 maybe utilized by the user, the manufacturer, and/or the provider of the updated code and/or wireless module 200 for the reason aforementioned.

Figure 4:
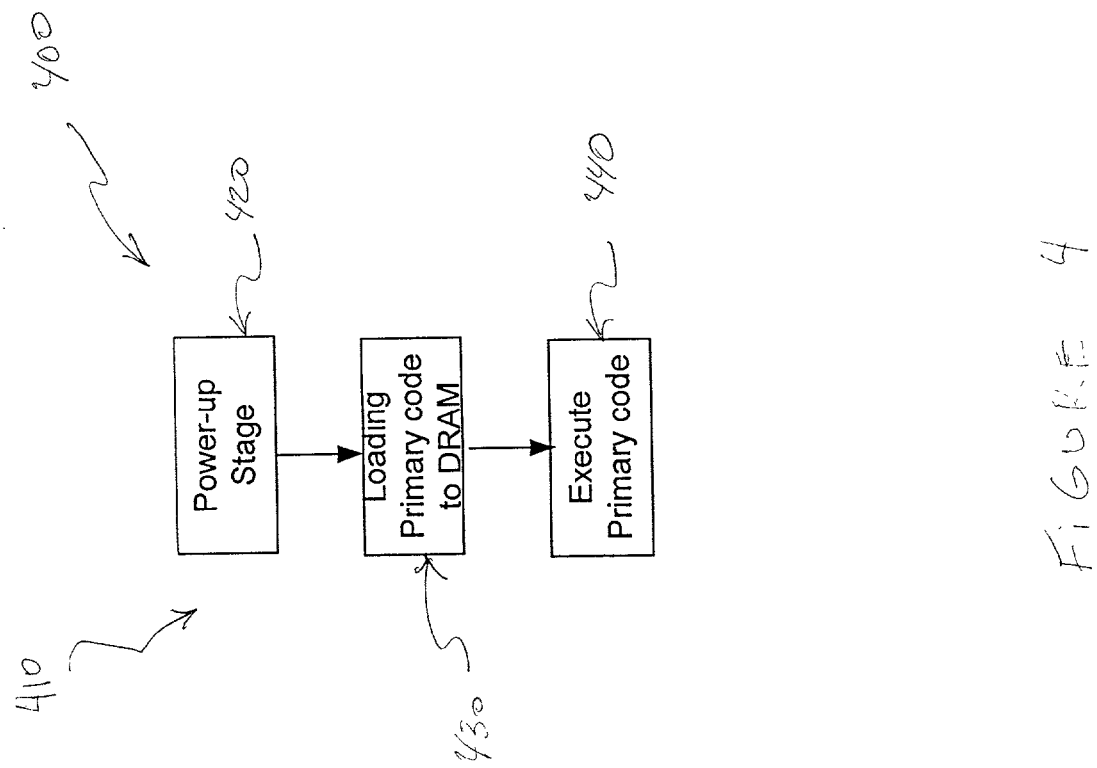
FIG. 4 is a flow diagram illustrating a power-up procedure after updating code.

FIG. 4 depicts a flow diagram 400 of one embodiment of a power-up procedure 410 utilizing wireless module 200 (shown in FIG. 1). As shown, in one embodiment, power-up procedure 340 includes a power-up stage 420 of wireless module 200 and/or the peripheral device. In one embodiment, once power-up stage 420 is completed, power-up procedure 410 progresses to a loading stage 430 where loading the primary code to DRAM 90 in wireless module 200 is accomplished. Once the primary code is loaded, in one embodiment, power-up procedure 410 progresses to an execution stage 440 where executing the primary code for operation of wireless module 200 and/or the peripheral device is further accomplished. In one embodiment, once power-up procedure 410 is performed wireless module 200 and/or the peripheral device will function properly and/or allow the user, manufacturer, and/or provider to switch the primary code and re-initiating step 420 and restart power-up procedure 410. In a further embodiment, the restarting of power-up procedure 410 may be performed as many times as possible depending upon the desire of the user, manufacturer, and/or service provider with a different primary code for operation of wireless module 200 and/or the peripheral device.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for updating code in a wireless telephone, comprising the acts of:
   providing a first operational code to the telephone, the first operational code being error-checked and being useful by the telephone for effecting wireless communication;
   engaging a wireless module with the telephone, the wireless module including a removable memory medium holding an updated operational code; and
   transferring the updated operational code from the wireless module to the telephone, wherein the memory medium includes a NAND FLASH device.

2. A method for updating code in a wireless telephone, comprising the acts of:
   providing a first operational code to the telephone, the first operational code being error-checked and being useful by the telephone for effecting wireless communication;
   engaging a wireless module with the telephone, the wireless module including a removable memory medium holding an updated operational code;
   transferring the updated operational code from the wireless module to the telephone; and
   wirelessly transmitting the updated operational code to the wireless module, wherein the updated operational code is transmitted to the wireless module using at least one format selected from the group consisting of: IS-95B, CDMA 2000 1x, CDMA 1x EV, CDMA ONE, Wideband CDMA, GSM, GPRS, and EDGE.

3. A method for updating code in a wireless telephone, comprising the acts of:
   providing a first operational code to the telephone, the first operational code being error-checked and being useful by the telephone for effecting wireless communication;
   engaging a wireless module with the telephone, the wireless module including a removable memory medium holding an updated operational code;
   transferring the updated operational code from the wireless module to the telephone;
   checking the updated operational code for errors; and
   only if the updated operational code is verified as error free, using the updated operational code at the wireless telephone in lieu of the first operational code for effecting wireless communication.

4. A method for updating code in a wireless telephone, comprising the acts of:
   providing a first operational code to the telephone, the first operational code being error-checked and being useful by the telephone for effecting wireless communication;
   engaging a wireless module with the telephone, the wireless module including a removable memory medium holding an updated operational code;
   transferring the updated operational code from the wireless module to the telephone; and
   storing incidental information related to the updated operational code to a NAND FLASH device in at least one of the wireless module, and the wireless telephone.

5. A method for updating code in a wireless telephone, comprising the acts of:
   providing a first operational code to the telephone, the first operational code being error-checked and being useful by the telephone for effecting wireless communication;
   engaging a wireless module with the telephone, the wireless module including a removable memory medium holding an updated operational code; and
   transferring the updated operational code from the wireless module to the telephone; and
   storing both operational codes in the wireless telephone for selective use thereof by the telephone.

6. A wireless communication device, comprising:
   storage means for storing both an initial operational code and an updated operational code;
   means for designating the initial operational code as a primary code to be used for wireless communication;
   means for subsequently designating the updated operational code as the primary code and undesignating the initial operational code as the primary code; and
   means for undesignating the updated operational code as the primary code and redesignating the initial operational code as the primary code.

7. The device of claim 6, wherein the means for undesignating executes in response to a user selection of a primary code.

8. The device of claim 6, wherein the means for subsequently designating executes only if the updated code is verified to be error-free.

* * * * *